(12) United States Patent
Yamaguchi

(10) Patent No.: US 6,456,111 B1
(45) Date of Patent: Sep. 24, 2002

(54) RECEIVER CIRCUIT FOR A COMPLEMENTARY SIGNAL

(75) Inventor: Masayuki Yamaguchi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/975,440

(22) Filed: Oct. 11, 2001

(30) Foreign Application Priority Data

Oct. 20, 2000 (JP) ........................................ 2000-321274

(51) Int. Cl.[7] .................. H03K 19/094; H03K 19/0175
(52) U.S. Cl. ......................... 326/86; 326/23; 326/115; 327/57
(58) Field of Search ............................ 326/23, 24, 25, 326/83, 86, 115, 127; 327/57, 52, 56, 54, 53

(56) References Cited

U.S. PATENT DOCUMENTS 6,060,912 A * 5/2000 Opris et al. .................. 327/57

6,184,722 B1 * 2/2001 Hayakawa .................... 327/55

FOREIGN PATENT DOCUMENTS

JP           11-229660           8/1999

* cited by examiner

*Primary Examiner*—Daniel D. Chang

(57) ABSTRACT

A receiver circuit in a communication system receives a complementary potential signal having a ground level or a floating level from a transmitter circuit through a pair of transmission lines. The receiver circuit includes first and second switching transistors for supplying a complementary current signal based on the complementary potential signal, a current detection transistor for detecting the current flowing through the switching transistors, and a potential control unit for controlling the gate potentials of the switching transistors based on the detected current for implementing a negative feedback loop. The negative feedback loop compensates the influence by a fluctuation of the potential of the transmitter circuit or the receiver circuit.

7 Claims, 4 Drawing Sheets

RECEIVER CIRCUIT FOR A COMPLEMENTARY SIGNAL

BACKGROUND OF THE INVENTION (a) Field of the Invention

The present invention relates to a receiver circuit for a complementary signal and, more particularly, to a receiver circuit having an interface for receiving a complementary signal from a pair of signal transmission lines in a communication system.

(b) Description of the Related Art

A computer network system generally includes a communication system having a transmitter circuit and a receiver circuit for transmission of data between the host computer and each terminal unit. The communication system installed in the computer network system uses a low voltage differential signaling (LVDS) technique wherein transmitted data assumes a complementary current signal, thereby achieving a high-speed data transmission via a pair of signal transmission lines.

FIG. 1 shows a conventional receiver circuit used in a communication system, which is described in Patent Publication JP-A-11-229660. The receiver circuit includes first and second input terminals 13 and 14 connected to a transmitter circuit (not shown) via a pair of signal transmission lines 17 and 18, a bias terminal 15 maintained at a specified potential, and an output terminal 16 for delivering an output signal.

The transmitter circuit transmits a complementary potential signal to the input terminals 13 and 14 by setting the transmission lines either at a ground level or at a high-impedance state (or floating level) based on the data to be transmitted. In this case, when one of the first and second input terminals 13 and 14 assumes a ground potential, the other of the first and second input terminals 13 and 14 assumes a floating level.

Assuming that the first input terminal 13 assumes a ground potential and the second input terminal 14 assumes a floating level, transistors Qn1 and Qn3 are turned on to lower the potential of a node Nb to a low level, whereas transistors Qn2 and Qn4 are tuned off to raise the potential of a node Na to a high level.

On the other hand, if the first input terminal 13 assumes a floating level and the second input terminal 14 assumes a ground level, transistors Qn1 and Qn3 are turned off to raise the potential of node Nb to a high level, whereas transistors Qn2 and Qn4 are turned on to lower the potential of node Na to a low level.

NAND gates 31 and 32 are so connected to form an RS flip-flop for latching a data based on the levels of nodes Na and Nb, and delivers the latched data to the output terminal 16 via an inverter 33.

The conventional receiver circuit as described above operates on the basis of the constant currents supplied from transistors Qp1 to Qp4, and delivers the output data corresponding to the transmitted complementary signal based on the potentials of nodes Na and Nb.

In the operation of transistors (discharging transistors) Qn5 and Qn6, when transistor Qn1 or Qn2 is turned off, the corresponding transistor Qn5 or Qn6 passes a current, which is about 10 to 25% of the current when transistor Qn1 or Qn2 is turned on, to the ground. This operation allows the receiver circuit to assume a symmetry between the circuit configuration as observed from the first input terminal 13 and the circuit configuration as observed from the second input terminal 14, thereby achieving a high-speed and stable signal transmission.

In the conventional receiver circuit as described above, however, there is a problem in that the amplitude of the transmitted signal is lowered to reduce the operational margin of the receiver circuit if the ground potential of the transmitter circuit is higher than the ground potential of the receiver circuit due to some reason. This hinders the high-speed and stable signal transmission of the receiver circuit.

SUMMARY OF THE INVENTION

It is an object of the present invention to solve the above problem and provide a receiver circuit for use in a communication system, which is capable of achieving a high-speed and stable operation thereof irrespective of a potential difference residing between the ground potential of the receiver circuit and the ground potential of the transmitter circuit.

The present invention provides, in a first aspect thereof, a receiver circuit including: first and second input terminals for receiving a complementary potential signal having a fixed potential level and a floating level; first and second current sources each having first and second terminals, the first terminals of the first and second current sources being connected together; first and second switching transistors each connected between a corresponding one of the first and second input terminals and the second terminal of a corresponding one of the first and second current sources; a current detection transistor connected between the first terminals of the first and second current sources and a first power source line; a voltage control unit for applying a potential corresponding to a current detected by the current detection transistor to gates of the first and second switching transistors; and an RS latch circuit for receiving potentials of drains of the first and second switching transistors at a set input and a reset input, respectively, of the RS latch circuit.

The present invention provides, in a second aspect thereof, a receiver circuit including: first and second input terminals for receiving from first and second transmission lines a complementary potential signal having a fixed potential level and a floating level; first and second current supplying units including first and second switching transistors, respectively, for supplying currents in the form of a complementary current signal corresponding to the complementary potential signal through the first and second terminals to the first and second transmission lines; an RS latch circuit for latching a set signal and a reset signal corresponding to the complementary current signal; a current detection unit for detecting a sum of currents supplied from first and second current supplying unit to output a current detection signal; and a potential control unit for controlling gate potentials of the first and second switching transistors based on the current detection signal for implementing a negative feedback loop.

In accordance with the receiver circuits of the present invention, since the current fluctuation due to the fluctuation of the complementary potential signal can be suppressed by the voltage control unit or the negative feedback loop, the potential difference between the ground potential of the transmitter circuit and the ground potential of the receiver circuit does not degrades the operational margin of the receiver circuit and thus does not hinder the high-speed and stable operation thereof.

The above and other objects, features and advantages of the present invention will be more apparent from the following description, referring to the accompanying drawings.

PREFERRED EMBODIMENTS OF THE INVENTION

Figure 1:
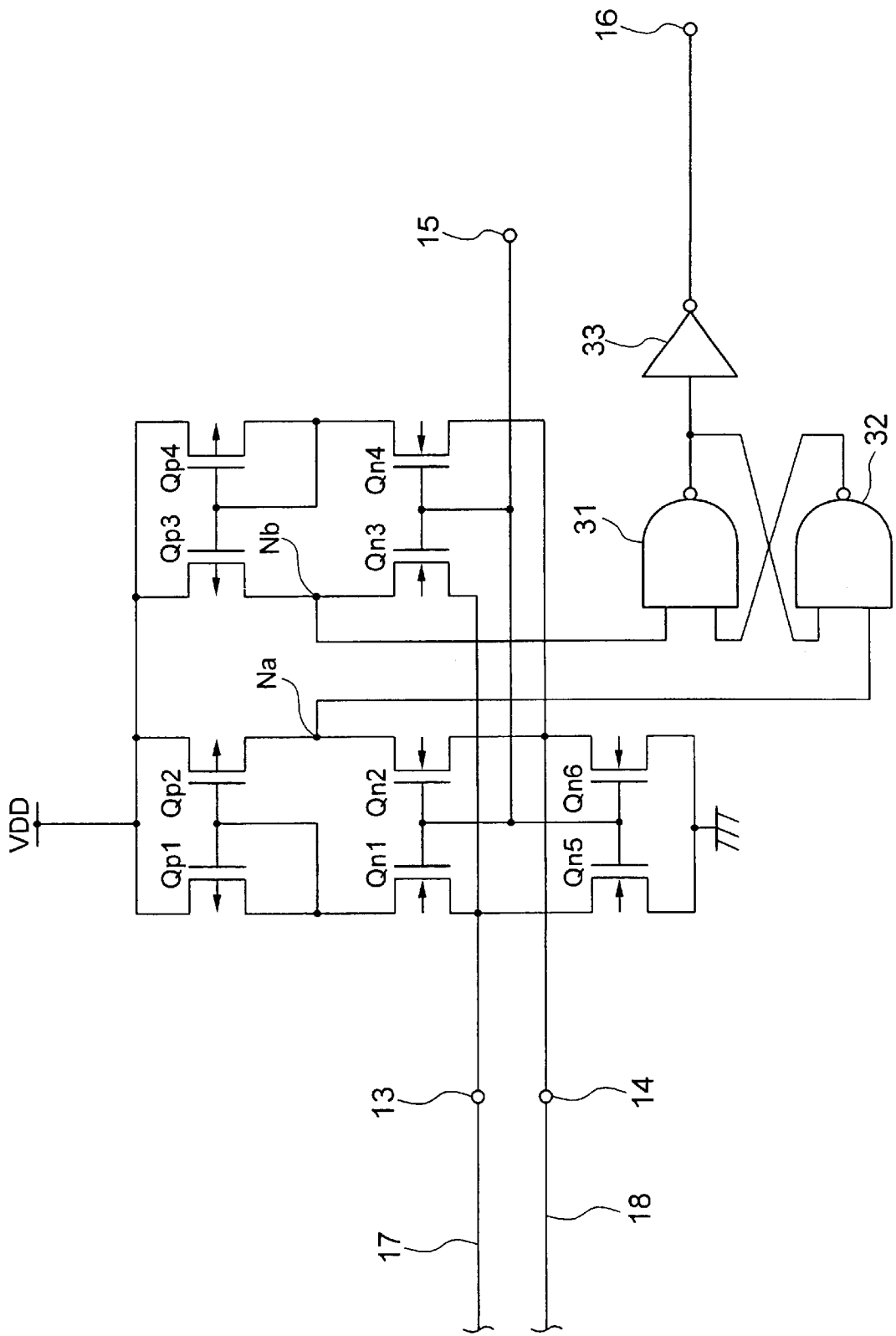
FIG. 1 is a circuit diagram of a conventional receiver circuit.

Now, the present invention is more specifically described with reference to accompanying drawings, wherein similar constituent elements are designated by similar reference numerals throughout the drawings.

Figure 2:
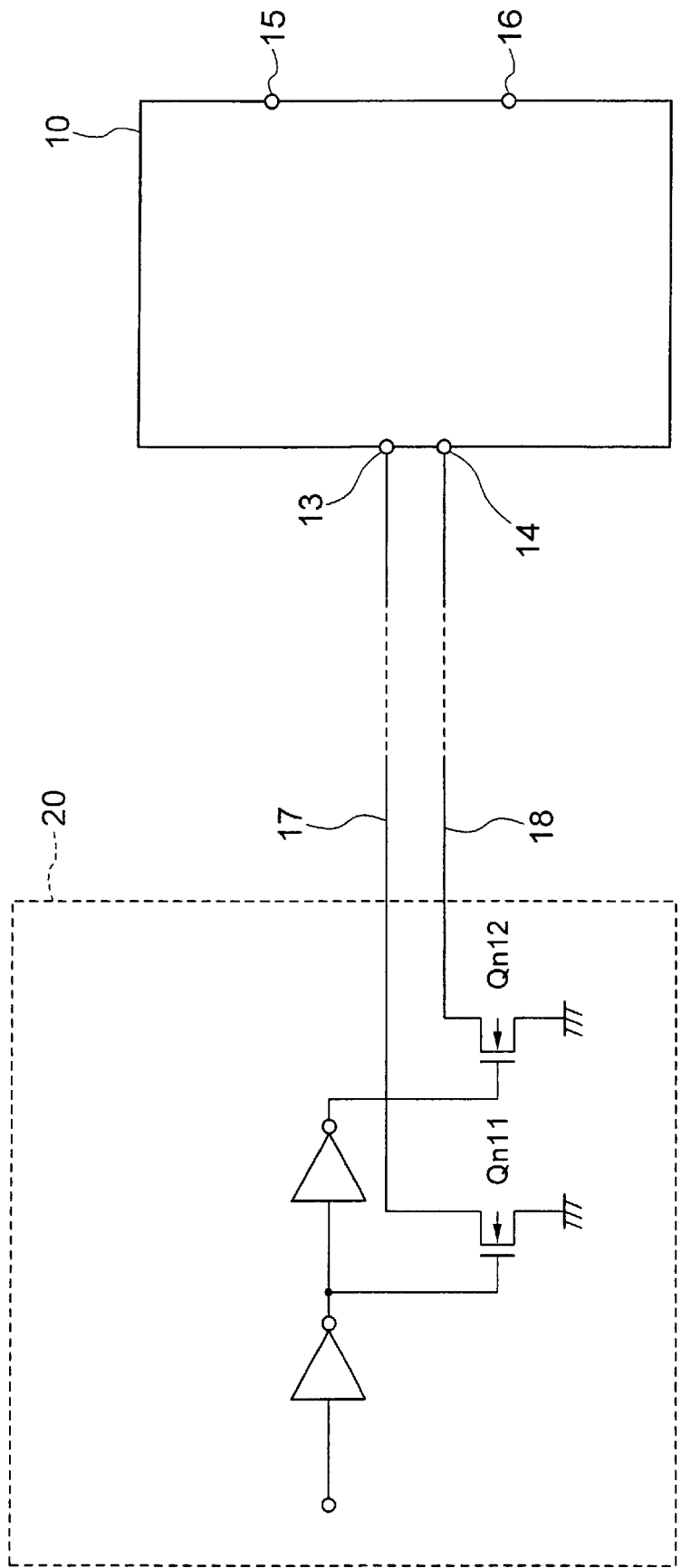
FIG. 2 is a schematic circuit diagram of a communication system including a receiver circuit according to a first embodiment of the present invention.

Referring to FIG. 2, a receiver circuit, generally designated by numeral 10, according to a first embodiment of the present invention is installed in a communication system. The communication system is disposed in a computer network system and is connected between a pair of computer systems, which transfer data therebetween. In the communication system, the receiver circuit 10 is connected to a transmitter circuit 20 via first and second signal transmission lines 17 and 18, which transmit a complementary potential signal (or complementary switching signal).

The receiver circuit 10 includes first and second input terminals 13 and 14, a bias terminal 15 and an output terminal 16. The transmitter circuit 20 includes an n-channel MOSFET Qn11 operating based on a transmitted data to deliver an output signal through the first transmission line 17, and an n-channel MOSFET Qn12 operating based on an inverted transmitted data to deliver an output signal through the second transmission line 18.

Figure 3:
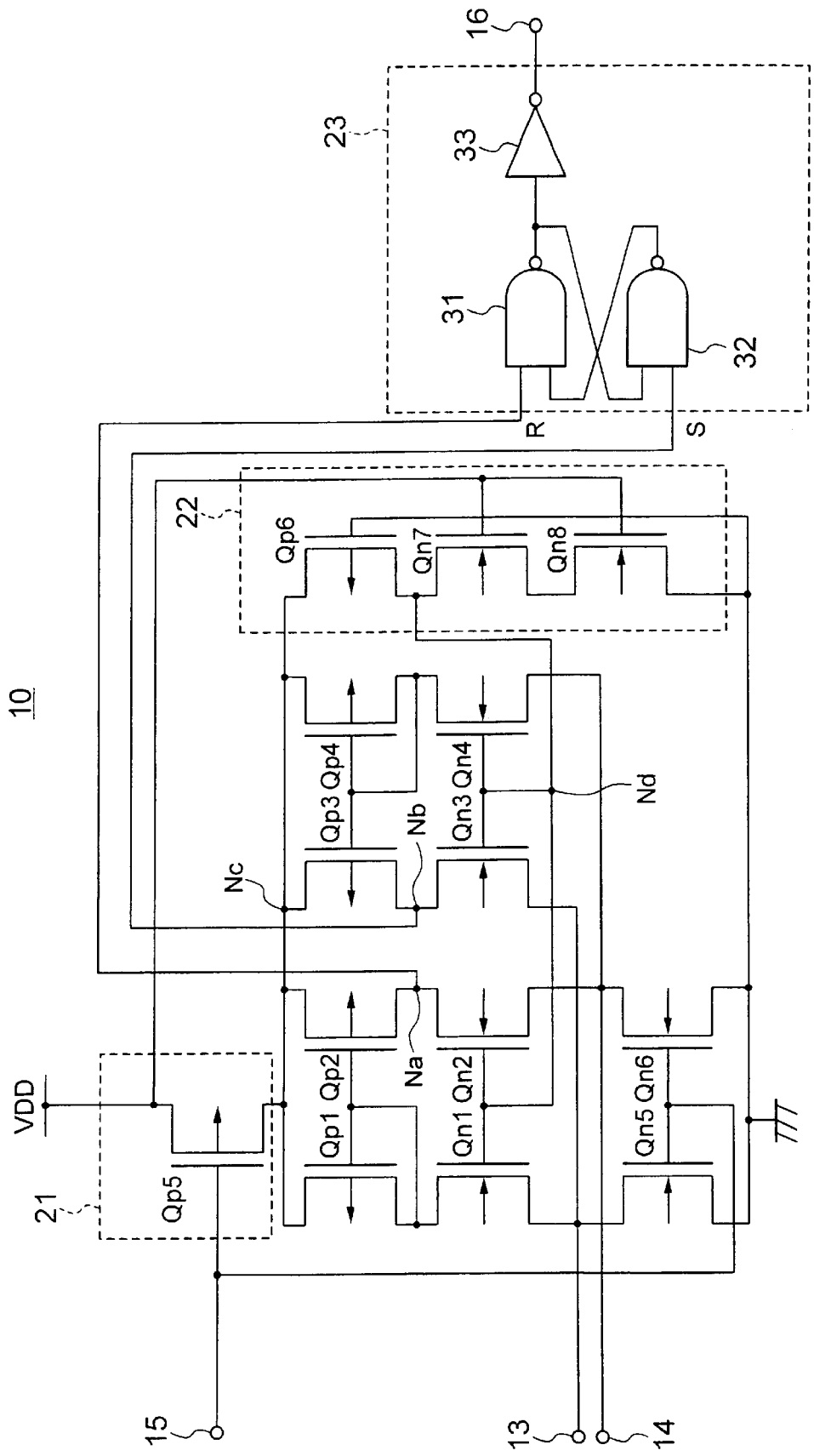
FIG. 3 is a circuit diagram of the receiver circuit shown in FIG. 2.

Referring to FIG. 3, the receiver circuit 10 shown in FIG. 2 includes p-channel MOSFETs Qp1 to Qp6, n-channel MOSFETs Qn1 to Qn8, and an RS latch circuit 23 including NAND gates 21 and 22 and an inverter 33. Transistors Qp1 and Qn1 are connected in series between node Nc and the first input terminal 13, and transistors Qp3 and Qn3 are connected in series between node Nc and the first input terminal 13, whereby transistors Qp1, Qn1, Qp3 and Qn3 constitute a first current supplying unit. Transistors Qp2 and Qn2 are connected in series between node Nc and the second input terminal 14, and transistors Qp4 and Qn4 are connected in series between node Nc and the second input terminal 14, whereby transistors Qp2, Qn2, Qp4 and Qn4 constitute a second current supplying unit.

The gates of transistors Qp1 and Qp2 are connected to the drain of transistor Qp1 to form a current mirror. The gates of transistors Qp3 and Qp4 are connected to the drain of transistor Qp4 to from a current mirror. Transistors Qn1 to Qn4 are switching transistors. Thus, each current supplying unit includes a pair of current sources and a pair of switching transistors.

Transistor Qp5 has a gate connected to the bias terminal 15, a source connected to a VDD power source line and a drain connected to node Nc, and constitutes a current detector 21. Transistors Qp6, Qn7 and Qn8 are connected in series between node Nc and the ground, and form a potential control unit 22. The gates of transistors Qn1, Qn2, Qn3 and Qn4 are connected together to common drains of transistors Qp6 and Qn7. the discharging transistors Qn5 and Qn6 are connected between the first input terminal 13 and the ground and between the second input terminal 14 and the ground, respectively. The gates of the discharging transistors Qn5 and Qn6 are connected to the bias terminal 15. The gate of transistor Qp6 is connected to the ground, and the gates of transistors Qn7 and Qn8 are connected to the VDD power source line, whereby the potential control unit 22 implements voltage divider or a resistor ladder.

The first input of NAND gate 31 is connected through a node Na to the common drains of transistors Qp2 and Qn2, and the first input of NAND gate 32 is connected through a node Nb to the common drains of transistors Qp3 and Qn3. The second input of NAND gate 31 is connected to the output of NAND gate 32, whereas the second input of NAND gate 32 is connected to the output of NAND gate 31, thereby forming a RS flip-flop having a reset input at the first input of NAND gate 31 and a set input at the first input of NAND gate 32. The inverter 33 has an input connected to the output of the RS flip-flop or the output of NAND gate 31 and an output connected to the output terminal 16.

The transmitter circuit 20 shown in FIG. 2 delivers a complementary potential signal through the signal transmission lines 17 and 18 by setting the transmission line 17 or 18 either at a ground level or a floating level, based on the data to be transmitted.

In operation of the receiver circuit 10, when the first input terminal 13 assumes a low level (ground level) and the second input terminal assumes a floating level, transistors Qn1 and Qn3 are turned on to have a current driveability corresponding to the gate-source potential thereof, i.e., the potential (Vd) of node Nd. Transistors Qp1 and Qp3 operate as constant current sources based on the potential (Vc) of node Nc to supply constant currents through transistors Qn1 and Qn3, respectively, and through the first input terminal 13 to the ground line of the transmitter circuit, thereby setting the potential (Vb) of node Nb to a low level.

Transistor Qn2 and Qn4 are turned off due to the floating level of the second input terminal 14. Transistors Qp2 and Qp4 operate as constant current sources to set the potential (Va) of node Na to a high level. Thus, the set input and the reset input of the RA latch circuit 23 assume a low level and a high level, respectively, whereby the output of the latch circuit 23 assumes a low level.

The first current supplying unit including transistors Qp1, Qn1, Qp3 and Qp3 supplies a current through the first transmission line 17 to the ground line of the transmitter circuit 20, whereas the second current supplying unit including transistors Qp2, Qn2, Qp4 and Qm4 stops the current for the second transmission line 18.

On the other hand, when the first input terminal 13 assumes a floating level and the second input terminal 14 assumes a low level, transistors Qn2 and Qn4 are turned on to have a current driveability corresponding to the gate-source potential thereof, i.e., the potential (Vd) of node Nd. Transistors Qp2 and Qp4 operate as constant current sources based on the potential (Vc) of node Nc to supply constant currents through transistors Qn2 and Qn4, respectively, and through the second input terminal 14 to the ground line of the transmitter circuit, thereby setting the potential (Va) of node Na to a low level.

Transistor Qn1 and Qn3 are turned off due to the floating level of the first input terminal 14. Transistors Qp1 and Qp3 operate as constant current sources to set the potential (Vb) of node Nb to a high level. Thus, the set input and the reset input of the latch circuit 23 assume a high level and a low level, respectively, whereby the output of the latch circuit 23 assumes a high level.

The first current supplying unit including transistors Qp1, Qn1, Qp3 and Qp3 stops for the first transmission line 17, whereas the second current supplying unit including transistors Qp2, Qn2, Qp4 and Qm4 supplies a current through the second transmission line 18 to the ground line of the transmitter circuit 20.

The RS latch circuit 13 determines the output thereof at the time instant at which the set input or the reset input thereof falls from a high level to a low level. If the set input falls from a high level to a low level, the output terminal 16 assumes a high level, whereas if the reset input falls from a high level to a low level, the output terminal 16 assumes a low level.

The bias terminal 15 is applied with a specified bias potential Vs. Each of discharging transistors Qp5 and Qn6 is turned on by the bias voltage Vs, and has a current driveability corresponding to the bias voltage Vs.

The discharging transistor Qn5 or Qn6 passes a balancing current to the ground line of the receiver circuit 10 based on the current driveability corresponding to the bias potential Vs when the corresponding input terminal 13 or 14 assumes a floating level, the balancing current being about 10 to 25% of the current flowing to the ground of the transmitter circuit 20 through the second or first input terminal which assumes a low level. Thus, the input terminal 13 or 14 which is set at a floating level by the transmitter circuit 20 is fixed at a specified level by the balancing current. The first or second current supplying unit which stops the current supply for the input terminal thus operates with a stable operation.

It is known that the signal transmission line has a transmission delay when the signal transmission line shifts between the ground potential and the floating potential due to the influence by the capacitive and resistive distributed constants involved with the signal transmission line, thereby generating a deformation in the transmitted waveform and thus preventing a high-speed signal transmission. In the present embodiment, when the signal transmission line shifts from a ground level to a floating level, a current is passed from the input terminal assuming the floating level to the ground, whereby the influence by the distributed constants is suppressed.

In addition, the circuit configuration of the first current supplying unit as observed from the first input terminal 13 and the circuit configuration of the second current supplying unit as observed from the second input terminal 14 are in symmetry with each other.

The receiver circuit 10 of the present embodiment suppresses the influence caused by the fluctuation of the ground potential as will be detailed hereinafter.

It is known that a potential difference sometimes occurs between the ground potential of the receiver circuit 10 and the ground potential of the transmitter circuit 20 due to noise generated during a long-distance signal transmission.

The current detection circuit 21 or transistor Qp5 supplies a current from the VDD power source line through node Nc to the first and second input terminals 13 and 14. The potential Vc of node Nc is thus equal to the VDD potential minus the source-drain voltage drop of transistor Qp5, which has a current driveability corresponding to the bias potential Vs. The potential control unit 22 including transistors Qp6, Qn7 and Qn8 divides the potential Vc to apply a divided potential Vd to node Nd based on the on-resistances of transistors Qp6, Qn7 and Qn8.

If a larger current signal flows through the switching transistors Qn1 to Qn4 due to a lower ground potential of the transmitter circuit 20 with respect to the ground potential of the receiver circuit 10, the current detecting transistor Qp5 provides a larger voltage drop to reduce the potential Vc of node Nc. The reduced potential Vc then reduces the divided potential Vd of node Nd, thereby reducing the current driveability of the switching transistors Qn1 to Qn4, whereby a negative feedback control can be obtained to maintain the current from the switching transistors Qn1 to Qn4 at a fixed value. This suppresses the fluctuation of the voltage amplitude between the signal transmission lines 17 and 18, thereby assuring a stable operational margin and a stable and high-speed signal transmission.

Figure 4:
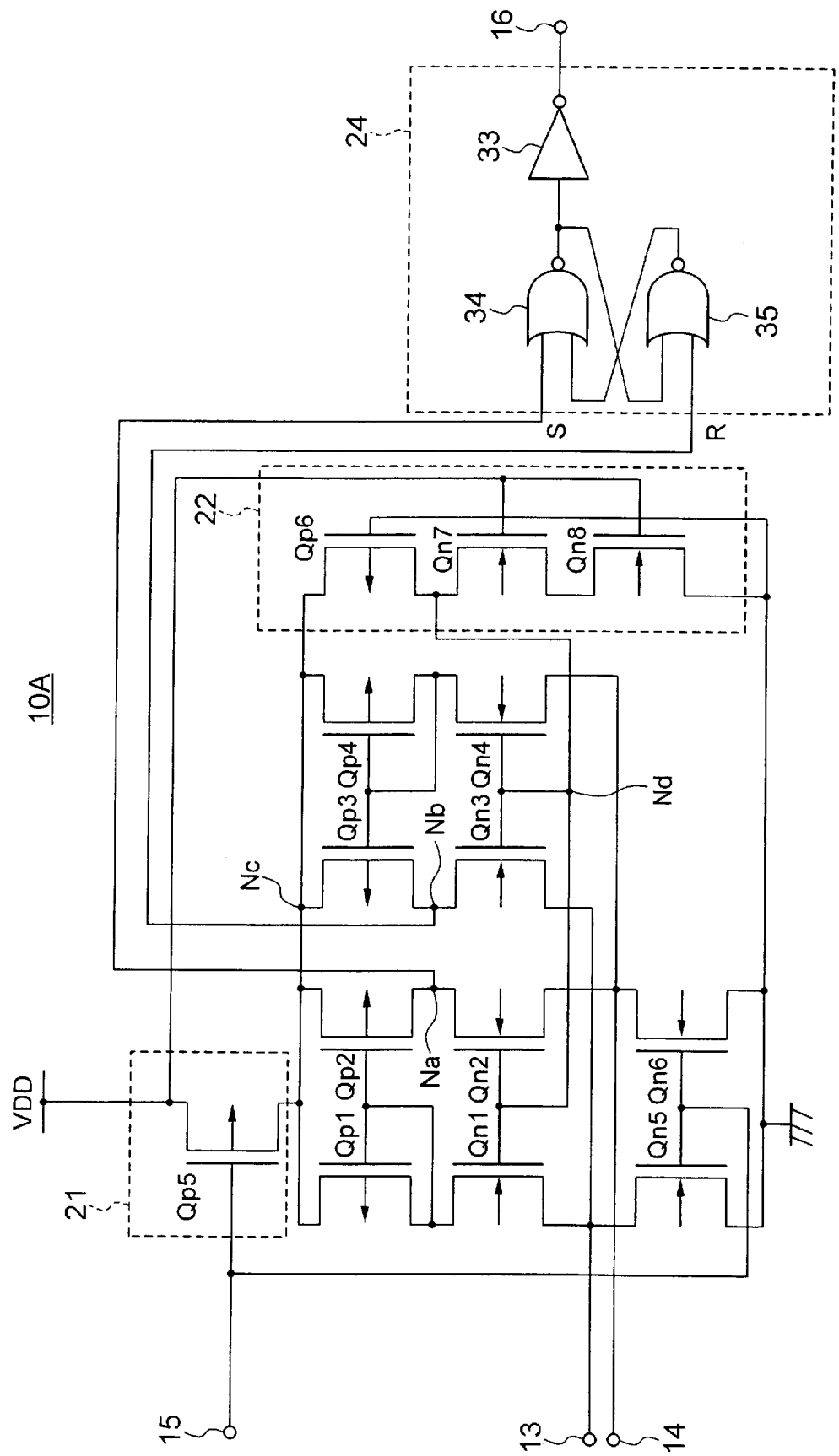
FIG. 4 is a circuit diagram of a receiver circuit according to a second embodiment of the present invention.

Referring to FIG. 4, a receiver circuit 10A according to a second embodiment of the present invention is similar to the first embodiment except that the RS latch circuit 24 in the present embodiment includes a pair of NOR gates 34 and 35 instead of the pair of NAND gates. The NOR gates 34 and 35 are connected to form an RS flip-flop, similarly to the NAND gates shown in FIG. 3.

In operation, when the potential Va of node Na and the potential Vb of node Nb assume a high level and a low level, respectively, the set input and the reset input of the RS latch circuit 24 assume a high level and a low level, respectively, whereby the output terminal 16 assumes a high level. On the other hand, when the potential Va of node Na and the potential Vb of node Nb assume a low level and a high level, respectively, the set input and the reset input of the RS latch circuit 24 assume a low level and a high level, respectively, whereby the output terminal 16 assumes a low level.

The RS latch circuit 24 determines the data thereof at the time instant at which either the set input or the reset input rises from a low level to a high level. If the set input rises from a low level to a high level, the output terminal 16 assumes a high level. On the other hand, if the reset input rises from a low level to a high level, the output terminal 16 assumes a low level.

By the configuration of the present embodiment, since the RS latch circuit 24 determines its data based on the signal transition from a low level to a high level, the operation of the RS latch circuit 24 can be stabilized due to the improvement of the waveform at the rising edge thereof.

In the above embodiments, each current supplying unit has includes a pair of constant current sources and a pair of switching transistors; however, the current supplying unit may have a single constant current source as well as a single switching transistor.

Since the above embodiments are described only for examples, the present invention is not limited to the above embodiments and various modifications or alterations can be easily made therefrom by those skilled in the art without departing from the scope of the present invention.

What is claimed is:

1. A receiver circuit comprising:

first and second input terminals for receiving a complementary potential signal having a fixed potential level and a floating level;

first and second current sources each having first and second current terminals, said first current terminals of said first and second current sources being connected together;

first and second switching transistors each connected between a corresponding one of said first and second input terminals and said second current terminal of a corresponding one of said first and second current sources;

a current detection transistor connected between said first current terminals of said first and second current sources and a first power source line;

a voltage control unit for applying a potential corresponding to a current detected by said current detection transistor to gates of said first and second switching transistors; and an RS latch circuit for receiving potentials of drains of said first and second switching transistors at a set input and a reset input, respectively, of said RS latch circuit.

2. The receiver circuit as defined in claim 1, further comprising first and second discharging transistors each connected between a corresponding one of said first and second input terminals and a second power source line, each of said first and second discharging transistors having a gate fixed at a bias potential, said current detection transistor having a gate fixed at said bias potential.

3. The receiver circuit as defined in claim 1, wherein said RS latch circuit includes a pair of NAND gates connected to form an RS flip-flop.

4. The receiver circuit as defined in claim 1, wherein said RS latch circuit includes a pair of NOR gates connected to form an RS flip-flop.

5. The receiver circuit as defined in claim 1, further comprising:

third and fourth current sources each having first and second current terminals, said first current terminals of said third and fourth current sources being connected together to said first current terminals of said first and second current sources; and third and fourth switching transistors each connected between a corresponding one of said first and second input terminals and said second current terminal of a corresponding one of said third and fourth current sources, gates of said third and fourth switching transistors being connected together to said gates of said first and second switching transistors.

6. The receiver circuit as described in claim 5, wherein said first and third current sources constitute a first current mirror, and said second and fourth current sources constitute a second current mirror.

7. A receiver circuit comprising:

first and second input terminals for receiving from first and second transmission lines a complementary potential signal having a fixed potential level and a floating level;

first and second current supplying units including first and second switching transistors, respectively, for supplying currents in the form of a complementary current signal corresponding to said complementary potential signal through said first and second input terminals to said first and second transmission lines;

an RS latch circuit for latching a set signal and a reset signal corresponding to said complementary current signal;

a current detection unit for detecting a sum of currents supplied a from said first and second current supplying units to output a current detection signal; and a potential control unit for controlling gate potentials of said first and second switching transistors based on said current detection signal for implementing a negative feedback loop.

* * * * *